(12) United States Patent
Boretti

(10) Patent No.: US 9,341,270 B2
(45) Date of Patent: May 17, 2016

(54) TOOL-LESS VALVE ACTUATOR CONNECTOR FOR A GLOBE VALVE ASSEMBLY

(71) Applicant: SCHNEIDER ELECTRIC BUILDINGS, LLC, Palatine, IL (US)

(72) Inventor: David Boretti, Lawrence, MA (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 39 days.

(21) Appl. No.: 14/444,204

(22) Filed: Jul. 28, 2014

(65) Prior Publication Data

US 2016/0025227 A1 Jan. 28, 2016

(51) Int. Cl.
*F16K 1/32* (2006.01)
*F16K 31/44* (2006.01)
*B23P 15/00* (2006.01)
*F16K 27/02* (2006.01)

(52) U.S. Cl.
CPC .................. *F16K 1/32* (2013.01); *B23P 15/001* (2013.01); *F16K 27/02* (2013.01); *F16K 31/44* (2013.01); *Y10T 137/0491* (2015.04); *Y10T 137/6065* (2015.04)

(58) Field of Classification Search
CPC ........... F16K 1/32; F16K 31/44; F16K 27/02; B23P 15/001; Y10T 137/6065
USPC .............. 251/291–292, 318, 367; 137/315.27
See application file for complete search history.

(56) References Cited

U.S. PATENT DOCUMENTS

| 1,540,529 | A | | 6/1925 | Blaisdell | |
|---|---|---|---|---|---|
| 1,764,991 | A | | 6/1930 | Siebs | |
| 2,622,763 | A | | 12/1952 | MacGregor | |
| 3,213,887 | A | | 10/1965 | Angelery | |
| 3,290,003 | A | * | 12/1966 | Kessler | F16K 27/08 137/315.27 |
| 3,430,919 | A | | 3/1969 | Frazier | |
| 3,472,269 | A | * | 10/1969 | Scholle | F16K 31/163 137/312 |
| 3,532,109 | A | * | 10/1970 | Smith | E03B 9/02 137/296 |
| 3,572,382 | A | | 3/1971 | Luthe | |
| 3,575,213 | A | | 4/1971 | Schnall | |
| 3,648,718 | A | | 3/1972 | Curran | |
| 3,838,707 | A | * | 10/1974 | Wachowitz, Jr. | F16K 41/10 137/312 |
| 3,958,275 | A | * | 5/1976 | Morgan | B63C 11/06 128/201.27 |
| 3,990,475 | A | | 11/1976 | Myers | |
| 4,237,936 | A | * | 12/1980 | Lollis | G01M 3/005 138/90 |
| 4,436,105 | A | | 3/1984 | Goans | |
| 4,570,665 | A | * | 2/1986 | Zimmerly | F16K 41/02 137/240 |

(Continued)

OTHER PUBLICATIONS

Notification of Transmittal of the International Search Report and the Written Opinion of the International Searching Authority from corresponding PCT/US2015/042225 dated Oct. 13, 2015.

*Primary Examiner* — John Bastianelli
(74) *Attorney, Agent, or Firm* — Lando & Anastasi, LLP

(57) ABSTRACT

A globe valve assembly includes a globe valve and a bonnet secured to a housing of the globe valve. The globe valve assembly further includes a yoke assembly having a yoke secured to a globe valve actuator, and a connector assembly secured to the yoke and configured to be connected to the bonnet to secure the globe valve to the globe valve actuator. The connector assembly includes a first arm pivotally secured to the yoke and a second arm pivotally secured to the yoke, with the first arm and the second arm being movable between an open position in which the yoke can receive the bonnet and a closed position in which the arms engage and connect the bonnet to the yoke, and a latch to fasten the arms in the closed position.

17 Claims, 9 Drawing Sheets

(56) References Cited

U.S. PATENT DOCUMENTS

| | | | |
|---|---|---|---|
| 4,693,451 A | 9/1987 | Tricini | |
| 4,832,311 A | 5/1989 | Kimura | |
| 5,288,052 A * | 2/1994 | Black | F16K 31/1262 251/291 |
| 5,365,759 A * | 11/1994 | Bonomi | F16K 35/06 137/385 |
| 5,772,182 A | 6/1998 | Stambaugh, Sr. et al. | |
| 6,206,024 B1 * | 3/2001 | Naberhaus | F16K 5/0642 251/113 |
| 6,394,135 B2 | 5/2002 | Erickson et al. | |
| 6,851,658 B2 | 2/2005 | Fitzgerald et al. | |
| 7,017,608 B2 | 3/2006 | Erickson et al. | |
| 7,083,160 B2 | 8/2006 | Baumann | |
| 7,159,617 B2 | 1/2007 | Erickson et al. | |
| 7,721,753 B2 | 5/2010 | Wears | |
| 7,926,784 B2 | 4/2011 | Fleming | |
| 2005/0012065 A1 | 1/2005 | Baumann | |
| 2006/0006356 A1 | 1/2006 | Hansson et al. | |
| 2009/0320931 A1 | 12/2009 | Wears | |
| 2010/0270491 A1 | 10/2010 | Faas | |
| 2011/0240901 A1 * | 10/2011 | Evertz | F16K 31/05 251/341 |
| 2012/0068099 A1 * | 3/2012 | Sealy | F16K 31/043 251/291 |
| 2012/0211688 A1 * | 8/2012 | Carlson | F16K 31/043 251/291 |
| 2014/0020909 A1 | 1/2014 | McKeon et al. | |

\* cited by examiner

TOOL-LESS VALVE ACTUATOR CONNECTOR FOR A GLOBE VALVE ASSEMBLY

BACKGROUND

1. Field of Disclosure

The present disclosure relates generally to valves, and more particularly to globe valves and globe valve actuators that are used in HVAC systems, and a tool-less valve actuator connector used to releasably connect the globe valve to the globe valve actuator.

2. Discussion of Related Art

In heating, ventilation, and air conditioning (HVAC) systems, globe valves are used for applications requiring throttling and shut off with an actuator that provides an operating force to aid in closing and opening of the valve as required. A typical globe valve includes a generally spherical body with two halves of the spherical body being separated by an internal baffle, which has an opening formed therein. The opening creates a valve seat in which a movable valve or plug is seated. An actuator, either manual or automatic, can be used to manipulate the movement of the plug to open and close the valve.

Typically, a conventional method used to connect a globe valve actuator to a U-style bonnet of a globe valve requires the use of a tool to securely fasten the bonnet to the globe valve actuator, which is labor intensive and can be somewhat less than intuitive to achieve. The added time required to connect the globe valve actuator to the bonnet of the globe valve can increase an "installed" cost associated with the globe valve.

SUMMARY OF DISCLOSURE

One aspect of the disclosure is directed to a globe valve assembly comprising a globe valve including a housing having an inlet and an outlet. The globe valve is configured to regulate a flow of fluid between the inlet and the outlet. The globe valve assembly further comprises a bonnet secured to the housing of the globe valve and a valve stem axially movable within the bonnet. The valve stem is secured to the valve member. The globe valve assembly further comprises a yoke assembly including a yoke secured to a globe valve actuator configured to move the valve stem and the valve member, and a connector assembly secured to the yoke and configured to be connected to the bonnet to secure the globe valve to the globe valve actuator. The connector assembly includes a first arm pivotally secured to the yoke and configured to engage the bonnet on one side of the bonnet, a second arm pivotally secured to the yoke and configured to engage the bonnet on an opposite side of the bonnet, with the first arm and the second arm being movable between an open position in which the yoke can receive the bonnet and a closed position in which the arms engage and connect the bonnet to the yoke, and a latch to fasten the arms in the closed position.

Embodiments of the globe valve assembly further may include providing a disc-shaped element on the bonnet and forming a slot in a lower portion of the yoke. The slot is configured to receive the disc-shaped element therein. The first arm includes a first clamping element and the second arm includes a second clamping element. The first clamping element is configured to engage the second clamping element to connect the bonnet when the disc-shaped element of the bonnet is received within the slot of the lower portion of the yoke. The first clamping element may include a clamp portion and the second clamping element may include a cam portion configured to mate with the clamp portion. The latch may include a first shoulder portion formed on the first arm and a second shoulder portion formed on the second arm, with the first shoulder portion being configured to engage the second shoulder portion when the first arm and the second arm are in the closed position. The first arm may be configured to be manipulated by hand to disengage the first shoulder portion from the second shoulder portion to move the first arm and the second arm to the open position. In one embodiment, the first arm is secured to the yoke by a first pin and the second arm is secured to the yoke by a second pin. The connector assembly further may include a slide lock having a body configured to slide along a length of the first arm. The slide lock may be configured to lock the first arm and the second arm in their closed position by sliding the body toward the second arm. The slide lock further may include a set screw configured to firmly fasten the body in place when locking the first arm and the second arm together.

Another aspect of the disclosure is directed to a connector assembly for connecting a globe valve assembly to a globe valve actuator. In one embodiment, the connector assembly comprises a first arm pivotally secured to a yoke of a yoke assembly that is secured to the globe valve actuator, and configured to engage a bonnet secured to the globe valve on one side of the bonnet, a second arm pivotally secured to the yoke and configured to engage the bonnet on an opposite side of the bonnet, the first arm and the second arm being movable between an open position in which the yoke can receive the bonnet and a closed position in which the arms engage and connect the bonnet to the yoke, and a latch to fasten the arms in the closed position.

Embodiments of the connector assembly further may include providing a disc-shaped element on the bonnet and forming a slot in a lower portion of the yoke. The slot is configured to receive the disc-shaped element therein. The first arm includes a first clamping element and the second arm includes a second clamping element. The first clamping element is configured to engage the second clamping element to connect the bonnet when the disc-shaped element of the bonnet is received within the slot of the lower portion of the yoke. The first clamping element may include a clamp portion and the second clamping element may include a cam portion configured to mate with the clamp portion. The latch may include a first shoulder portion formed on the first arm and a second shoulder portion formed on the second arm, with the first shoulder portion being configured to engage the second shoulder portion when the first arm and the second arm are in the closed position. The first arm may be configured to be manipulated by hand to disengage the first shoulder portion from the second shoulder portion to move the first arm and the second arm to the open position. In one embodiment, the first arm is secured to the yoke by a first pin and the second arm is secured to the yoke by a second pin. The connector assembly further may include a slide lock having a body configured to slide along a length of the first arm. The slide lock may be configured to lock the first arm and the second arm in their closed position by sliding the body toward the second arm. The slide lock further may include a set screw configured to firmly fasten the body in place when locking the first arm and the second arm together.

Yet another aspect of the disclosure is directed to a method of connecting a globe valve assembly to a globe valve actuator. In one embodiment, the method comprises: securing a connector assembly to a yoke of a yoke assembly that is secured to the globe valve actuator, the connector assembly including a first arm pivotally secured to the yoke and configured to engage the bonnet on one side of the bonnet, a second arm pivotally secured to the yoke and configured to engage the bonnet on an opposite side of the bonnet; positioning a bonnet of the globe valve in the yoke; moving the first arm and the second arm from an open position in which the yoke can receive the bonnet to a closed position in which the arms engage and connect the bonnet to the yoke; and fastening the arms in the closed position.

Embodiments of the method further may include locking the arms in the closed position by sliding a slide lock toward the second arm.

BRIEF DESCRIPTION OF THE DRAWINGS

Various aspects of at least one embodiment are discussed below with reference to the accompanying figures, which are not intended to be drawn to scale. Where technical features are followed by references signs, the reference signs have been included for the sole purpose of increasing the intelligibility of the figures, detailed description, and claims. Accordingly, neither the reference signs nor their absence are intended to have any limiting effect on the scope of any claim elements. Each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

Figure 1:
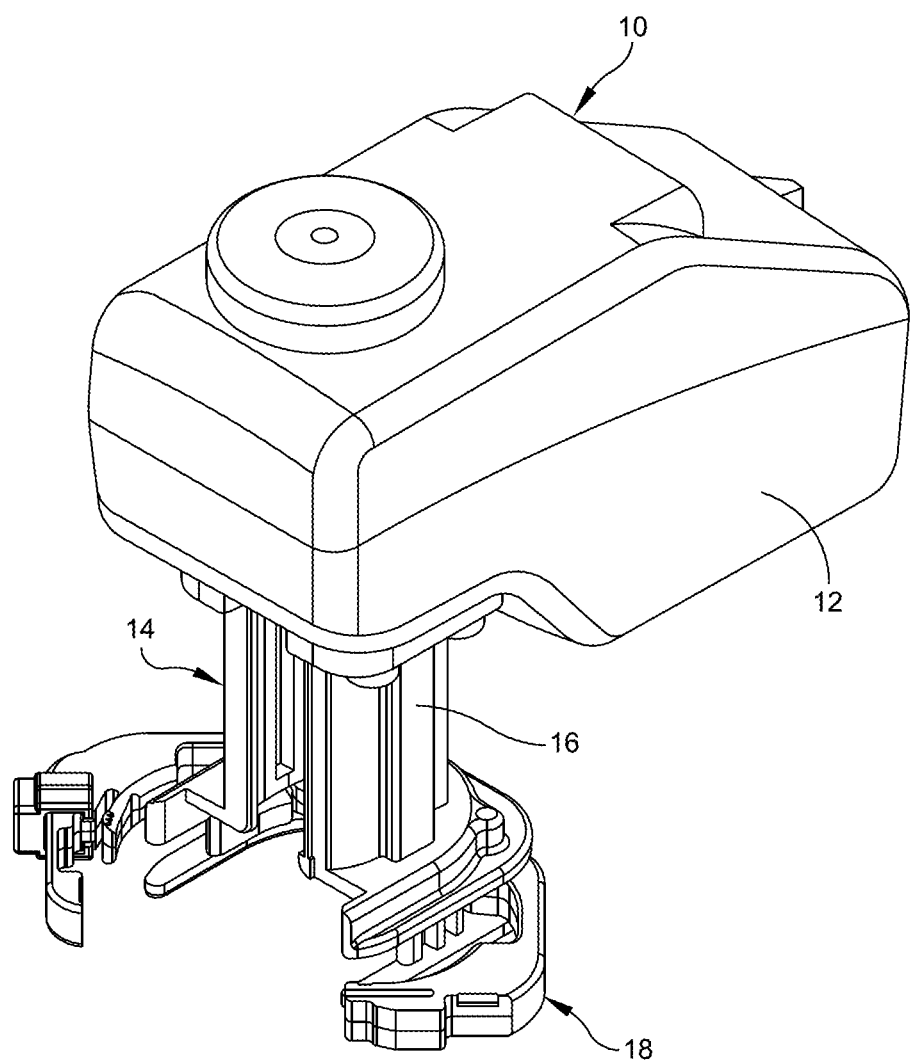
FIG. 1 is a perspective view of a globe valve actuator with a connector assembly of an embodiment of the present disclosure mounted on a lower end of the globe valve actuator.

FIG. 1 illustrates a globe valve actuator, generally indicated at 10, which is configured to operate a globe valve assembly. As shown, the globe valve actuator 10 includes a housing 12 designed to house the working components of the globe valve actuator and a yoke assembly, generally indicated at 14, having a yoke 16 that is secured the housing of the globe valve actuator. The yoke assembly 14 further has a connector assembly, generally indicated at 18, which is secured to the yoke 16. As will be described in greater detail below, the connector assembly 18 is configured to releasably connect a bonnet of a globe valve assembly to the globe valve actuator 10. The globe valve actuator 10 further may include a controller to control the operation of the globe valve actuator to activate and deactivate the globe valve assembly.

Figure 2:
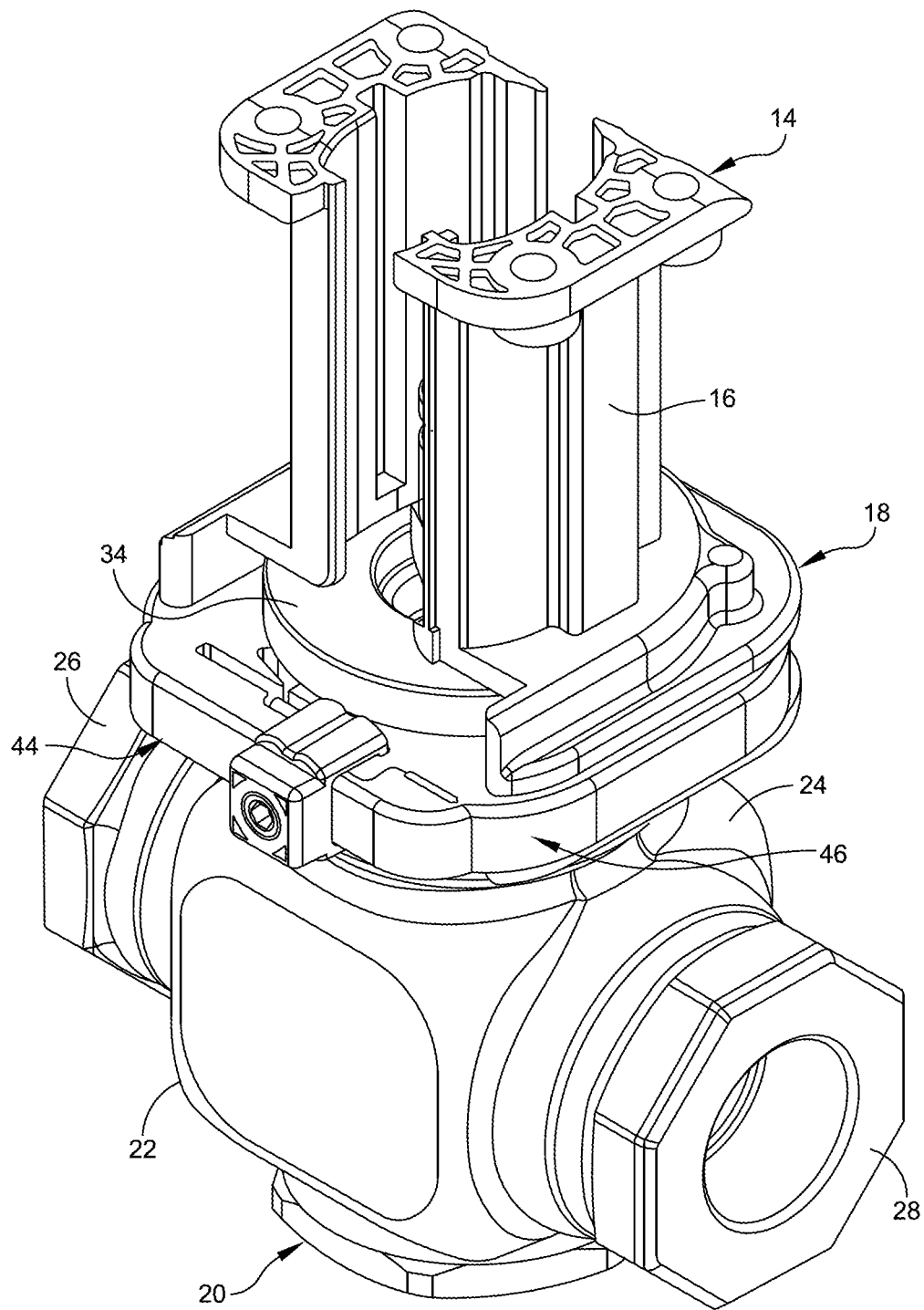
FIG. 2 is a perspective view of a portion of the globe valve actuator connected to a globe valve by the connector assembly.
Figure 3:
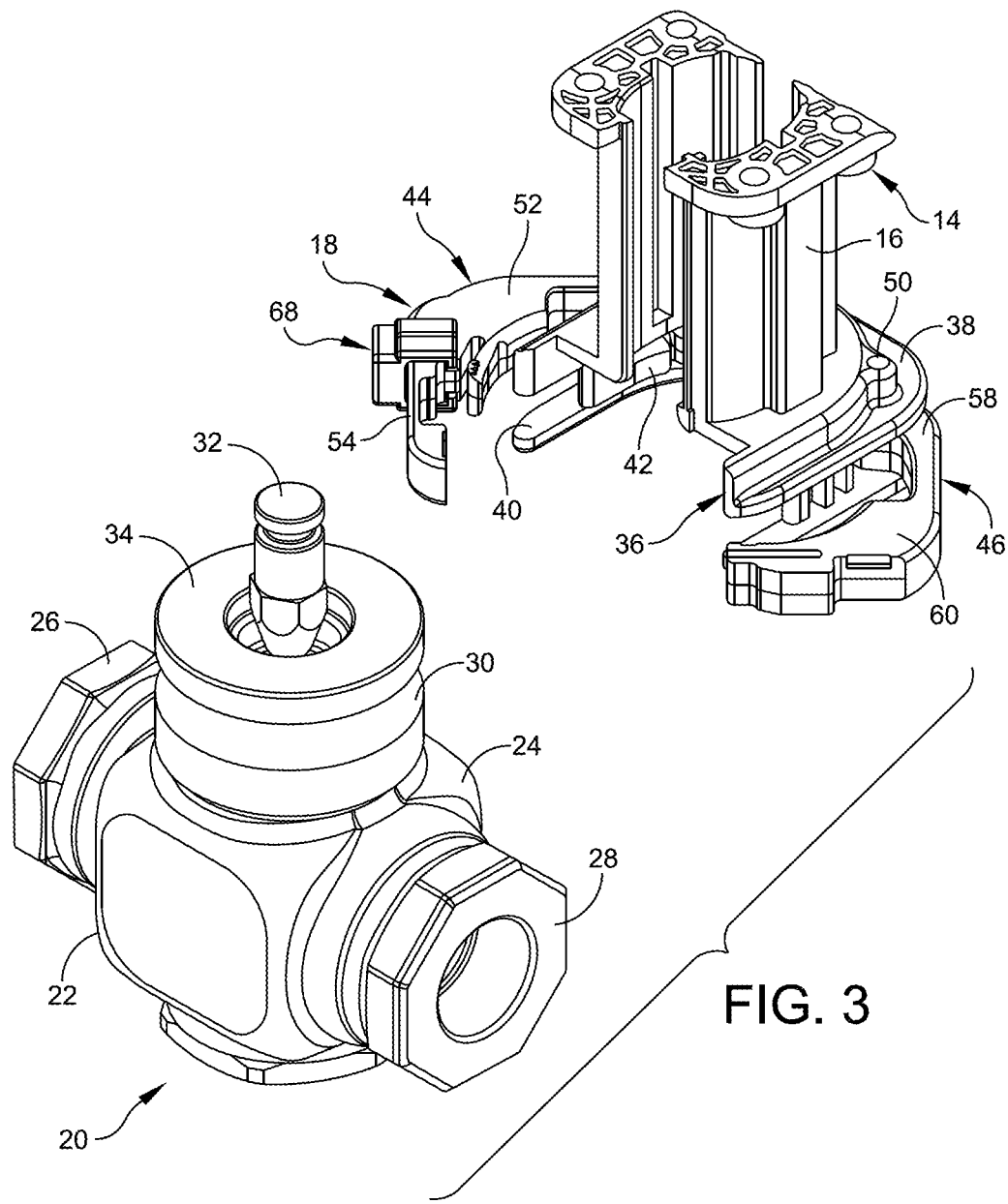
FIG. 3 is an exploded perspective view of the portion of the globe valve actuator and the connector assembly shown in FIG. 2 prior to connecting the globe valve to the globe valve actuator.

FIG. 2 illustrates the yoke assembly 14 connected to a globe valve assembly, generally indicated at 20. FIG. 3 illustrates the globe valve assembly spaced from the yoke assembly 14 prior to being connected to the yoke assembly and to the globe valve actuator 10. In the shown embodiment, the globe valve assembly 20 includes a globe valve 22, which can be a two-port valve, meaning the globe valve has a housing 24 with an inlet 26 and an outlet 28, although a three port valve may also be provided. With a typical globe valve, such as globe valve 22, the inlet 26 and the outlet 28 of the globe valve may be oriented straight across from each other or anywhere on the housing 24. A typical globe valve, such as globe valve 22, includes a cage, which is disposed within a chamber of the housing 24 between the inlet 26 and the outlet 28, and is configured to include a valve seat.

The globe valve 22 further includes a valve member or plug, which is disposed within the cage, with the cage guiding the movement of the valve member during operation. The valve member is movable within the cage between a closed position in which the valve member is seated on the valve seat of the cage and an open position in which the valve member is spaced from the valve seat to enable fluid communication between the inlet 26 and the outlet 28 of the housing 24 in the well-known manner. The valve member can be provided in a normally open position in which the globe valve actuator 10 is designed to close the valve member during operation or a normally closed position in which the globe valve actuator is designed to open the valve member during operation.

The globe valve assembly 20 further includes a bonnet 30, which can be threaded to the housing 24 of the globe valve 22, and slid over a valve stem 32, which is axially movable within the bonnet. The valve member is secured to an end of the valve stem 32, with the valve stem being configured to move the valve member upon actuating the valve stem. The bonnet 30 also contains packing material, which may embody a wearable material that maintains the seal between the bonnet and the valve stem 32 during valve cycling. The bonnet 30 illustrated in the drawings may be referred to as a U-style bonnet. As shown, the bonnet 30 includes a disc-shaped element 34, the purpose of which will be described in detail below when discussing the yoke assembly 14.

Figure 4:
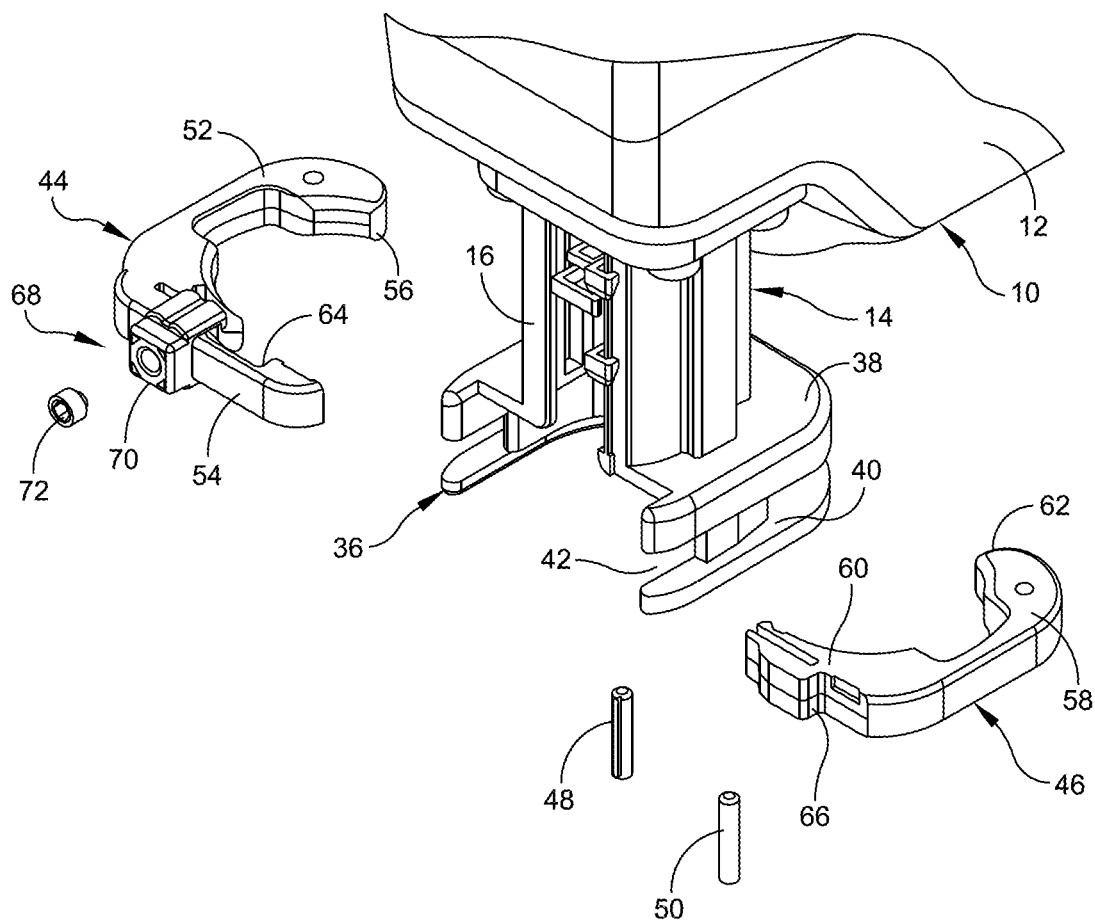
FIG. 4 is an exploded perspective view of the connector assembly.

Referring to FIG. 4, the yoke 16 of the yoke assembly 14 includes a U-shaped connector generally indicated at 36 provided at a lower portion of the yoke. As shown, the U-shaped connector 36 includes an upper wall 38 disposed along a horizontal plane and a lower wall 40 positioned below and spaced from the upper wall and also disposed along a horizontal plane. In one embodiment, the upper and lower walls 38, 40 are integrally formed with the lower portion of the yoke 16, and are configured to define a slot 42, which is sized to receive the disc-shaped element 34 of the bonnet 30 of the globe valve assembly 20. The arrangement is such when connecting the bonnet 30 of the globe valve assembly 20 to the globe valve actuator 10, the disc-shaped element 34 of the bonnet is positioned within the slot 42 to firmly seat the bonnet and the globe valve 22 with respect to the yoke assembly 14 and the globe valve actuator. The connector assembly 18 of embodiments of the present disclosure is provided to securely connect the globe valve assembly 20 to the globe valve actuator 10 prior to operating the globe valve actuator 10.

In one embodiment, the connector assembly 18, which includes the upper wall 38 and the lower wall 40 of the lower portion of the yoke 16 and together define the slot 42, further includes a first arm generally indicated at 44 that is pivotally secured to the upper and lower walls and a second arm generally indicated at 46 that is also pivotally secured to the upper and lower walls. As shown, the first arm 44 is pivotally secured to the upper and lower walls 38, 40 by a first pin 48 and the second arm 46 is pivotally secured to the upper and lower walls by a second pin 50. The arrangement is such that the first arm 44 and the second arm 46 pivot about respective axes in a horizontal plane that extends through the slot 42. In a certain embodiment, the first arm 44 and the second arm 46 are fabricated from a suitable plastic material, such as polyethylene/acrylonitrile butadiene styrene (PE/ABS), which is sufficiently strong to hold the bonnet 30 of the globe valve assembly 20 in place during operation of the globe valve actuator 10.

Figure 5:
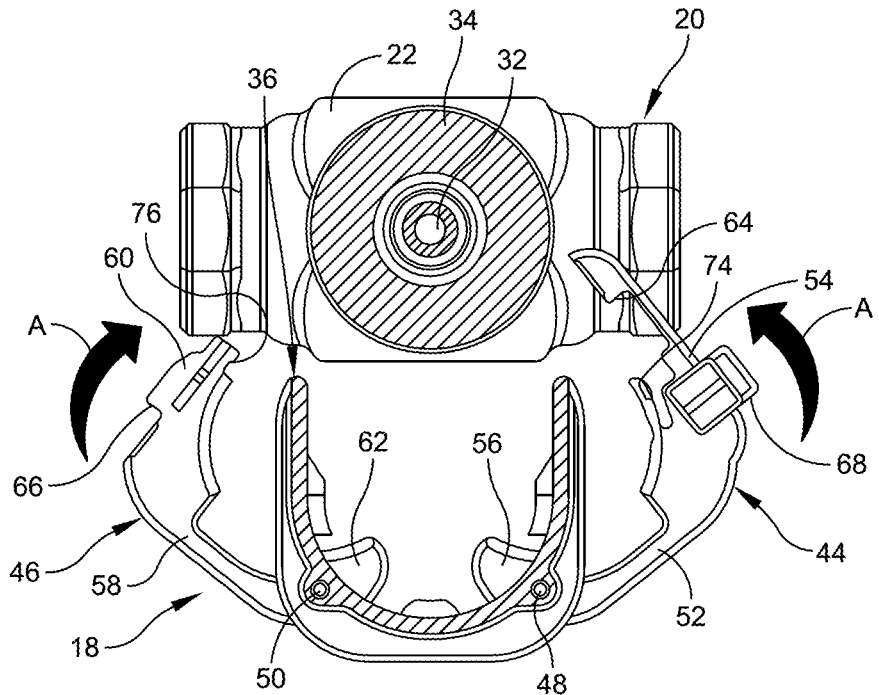
FIG. 5 is a partial cross sectional top view of the globe valve actuator and the globe valve prior to connecting the globe valve to the globe valve actuator.

Referring to FIG. 5, the first arm 44 and the second arm 46 are shown in an open or extended position. This open position is also illustrated in FIG. 3. The first arm 44 and the second arm 46 are designed to move from the open position to a closed position illustrated in FIG. 2 to connect the globe valve assembly 20 to the globe valve actuator 10. FIG. 5 illustrates by arrows A the movement of the first arm 44 and the second arm 46 from the shown open position to the closed position. As shown, the first arm 44 is generally L-shaped in construction having a first segment 52 that is pivotally connected to the upper and lower walls 38, 40 and a second segment 54 that extends from the first segment. The first segment 52 of the first arm 44 has an enlarged portion 56 that extends through the slot 42 and into a space designed to receive the disc-shaped element 34 of the bonnet 30 of the globe valve assembly 20. Similarly, the second arm 46 is generally L-shaped in construction having a first segment 58 that is pivotally connected to the upper and lower walls 38, 40 and a second segment 60 that extends from the first segment. The first segment 58 of the second arm 46 has an enlarged portion 62 that extends through the slot 42 and into the space designed to receive the disc-shaped element 34 of the bonnet 40 of the globe valve assembly 20. The arrangement is such that when the disc-shaped element 34 of the bonnet 30 is received within the slot 42, the disc-shaped element engages the enlarged portions 56, 62 of the first segments 52, 58 of the first and second legs 44, 46 to pivotally move the first and second legs to the closed position about their respective pins 48, 50.

Figure 6:
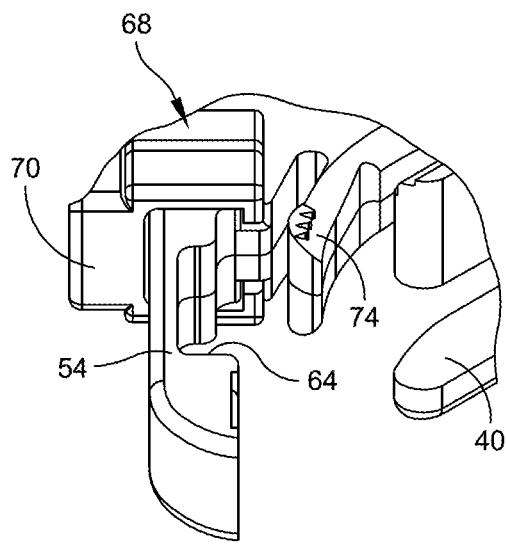
FIG. 6 is a perspective view of a connector arm of the connector assembly.

The second segment 54 of the first arm 44 and the second segment 60 of the second arm 46 are further configured with a latch to fasten the first arm and the second arm together when in the closed position. Referring additionally to FIG. 6, in one embodiment, the latch includes a first shoulder portion 64 formed on an end of the second segment 54 of the first arm 44. The latch further includes a second shoulder portion 66 formed on an end of the second segment 60 of the second arm 46. The arrangement is such that the first shoulder portion 64 is configured to engage the second shoulder portion 66 when the first arm 44 and the second arm 46 are in the closed position. Since the first arm 44 and the second arm 46 are formed from plastic material, the first arm is configured to be manipulated by hand to flex the second segment 54 with respect to the first segment 52 of the first arm to disengage the first shoulder portion from the second shoulder portion to move the first arm and the second arm to the open position.

The connector assembly 18 further includes a slide lock assembly generally indicated at 68 that is provided to lock the first arm 44 and the second arm 46 in the closed position. As shown, the slide lock assembly 68 has a body 70 configured to slide along a length of the second segment 54 of the first arm 44. The body 70 of the slide lock assembly 68 is designed to move from an unlocked position to a locked position to lock the first arm 44 and the second arm 46 in their closed position by sliding the body toward the second arm.

Once the body 70 is slid to its locked position, the slide lock assembly 68 further includes a set screw 72 received within a threaded opening formed in the body to secure the body in place. The set screw 72 can be turned by a suitable tool, e.g., an Allen key, to engage the set screw against the second segment 54 of the first arm 44, thereby retaining the body 70 of the slide lock assembly 68 in place. To unlock the body 70 of the slide lock assembly 68, the set screw 72 is unthreaded to enable sliding movement of the body so that the body can be slid away from the second arm 46. Once the body 70 is slid to its unlocked position, the first arm 44 and the second arm 46 can be moved to the open position by disengaging the first shoulder portion 64 from the second shoulder portion 66.

Figure 7:
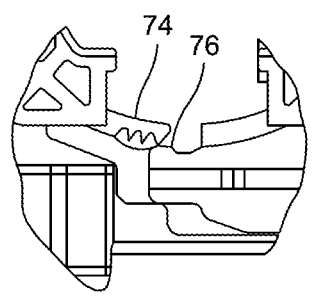
FIG. 7 is an enlarged top view of a portion of the connector assembly.

Referring additionally to FIG. 7, the connector assembly 18 further includes a clamp to further secure the first arm 44 and the second arm 46 to one another when in the closed position. In situations in which the first arm 44 and the second arm 46 are in the closed position, and the slide lock assembly 68 is in its unlocked position, the clamp along with the latch secure the arms to one another. As shown, the first arm 44 at a junction of the first segment 52 and the second segment 54 includes a first clamping element 74 and the second arm 46 at an end of the second segment 60 includes a second clamping element 76. The first clamping element 74 is configured to engage the second clamping element 76 to clamp the first arm 44 and the second arm 46 to one another, thereby further securing the bonnet 30 of the globe valve assembly 20 when the disc-shaped element 34 of the bonnet is received within the slot 42 of the lower portion of the yoke 16.

In one embodiment, the first clamping element 74 includes a clamp portion and the second clamping element 76 includes a cam portion that is specifically contoured to mate with the clamp portion. The arrangement is such that the cam portion 76 pushes on the clamp portion 74 when the first arm 44 and the second arm 46 completely surround the bonnet 30. This added feature provides additional pressure against the bonnet 30 to reduce actuator from vibrating and rotating around once installed.

Figure 8:
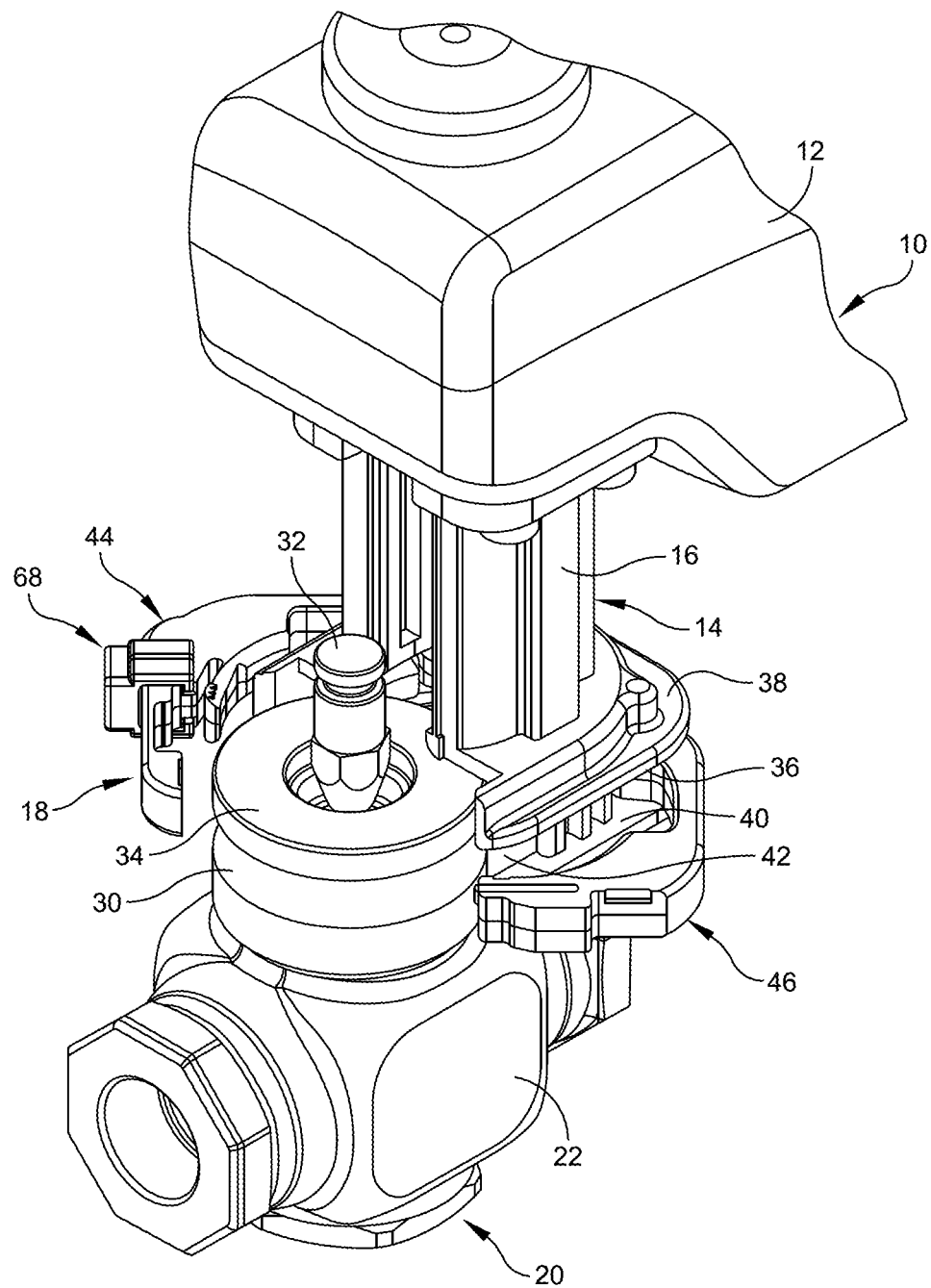
FIG. 8 is a perspective view of the globe valve actuator with the connector assembly being in an open position to receive the globe valve therein.

FIGS. 8-11 illustrate the connection of the globe valve assembly 20 to the globe valve actuator 10. As shown in FIG. 8, the first arm 44 and the second arm 46 of the connector assembly 18 are in the open position. In this position, the connector assembly 18 can receive the disc-shaped element 34 of the bonnet 30 of the globe valve assembly 20 into the slot 42 formed in the lower portion of the yoke 16 of the yoke assembly 14.

Figure 9:
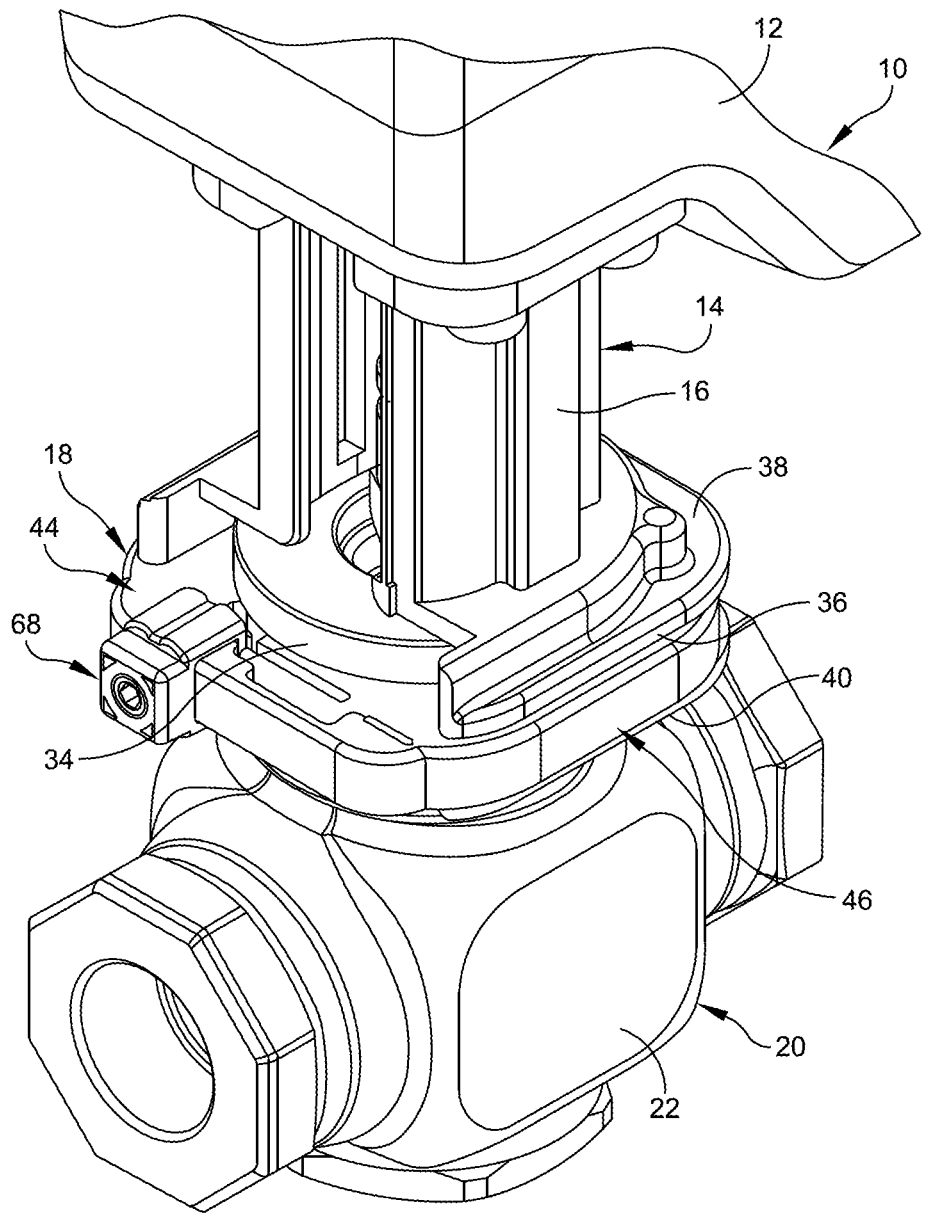
FIG. 9 is a perspective view of the globe valve actuator with the connector assembly being in a closed position to connect the globe valve therein with a retaining lock being in an unlocked position.

As shown in FIG. 9, the disc-shaped element 34 of the bonnet 30 is received in the slot 42 of the yoke 16, with the first arm 44 and the second arm 46 moved to the closed position. In this position, the first shoulder portion 64 of the first arm 44 and the second shoulder portion 66 of the second arm 46, which together form the latch, engage one another to fasten the arms together. Further, the first clamping element 74 engages the second clamping element 76, which together form the clamp, to reduce vibration and possible rotation of the globe valve assembly 20. As shown, the body 70 of the slide lock assembly 68 is in the unlocked position.

Figure 10:
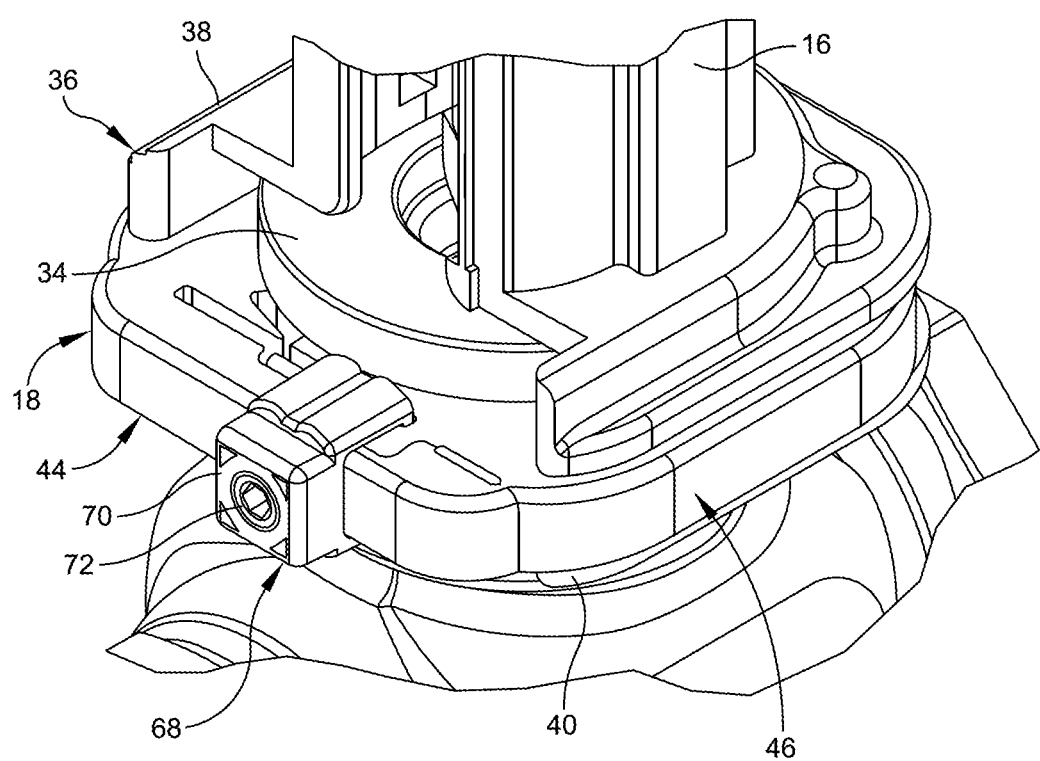
FIG. 10 is a perspective view of the globe valve actuator with the connector assembly being in a closed position and the retaining lock being in a locked position.

As shown in FIG. 10, the body 70 of the slide lock assembly 68 is moved from the unlocked position shown in FIG. 9 to the locked position to lock the first arm 44 and the second arm 46 in the closed position. This movement is achieved by sliding the body 60 of the slide lock assembly 68 toward the second arm 46 to achieve the position shown in FIG. 10.

Figure 11:
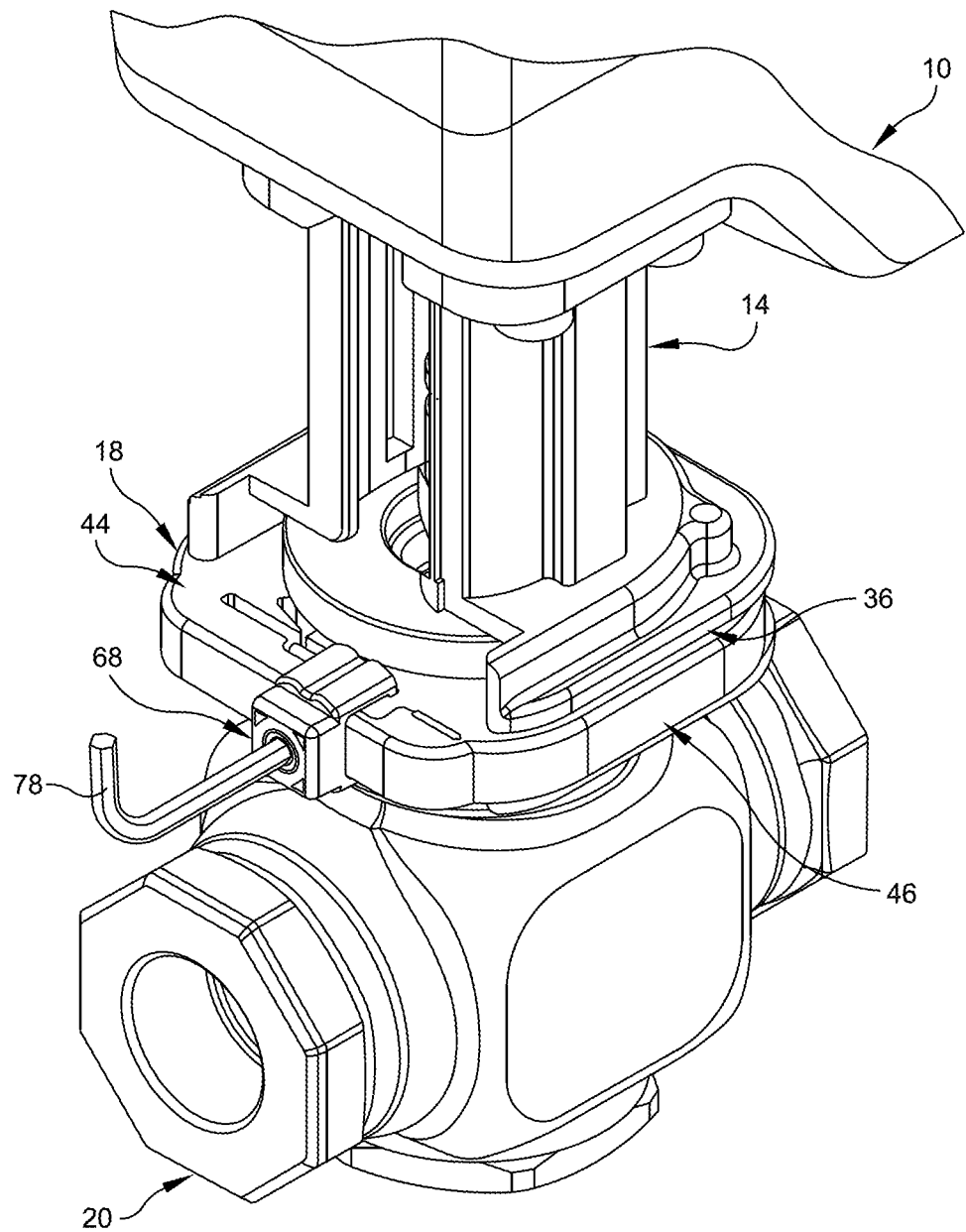
FIG. 11 is a perspective view showing a set screw of the connector assembly being secured in place by using a tool.

As shown in FIG. 11, after the body 70 of the slide lock assembly 68 is slid to the locked position, the set screw 72 of the slide lock assembly is tightened to secure to the body in place. As shown, a tool 78, such as an Allen key, is provided to tighten the set screw 72 against the second segment 54 of the first arm 44, thereby retaining the body 70 of the slide lock assembly in place.

As mentioned above, to unlock the body 70 of the slide lock assembly 68, the set screw 72 is unthreaded to enable sliding movement of the body so that the body can be slid away from the second arm 46. After the body 70 is slid to its unlocked position, the first arm 44 and the second arm 46 can be moved to the open position by disengaging the first shoulder portion 64 from the second shoulder portion 64. During this initial movement, the first clamping element 74 disengages the second clamping element 76.

Thus, it should be observed that the valve actuator connector of embodiments of the present disclosure is faster to install, more reliable, less costly, and more intuitive to operate than prior art connectors. Although embodiments of the connector assembly 18 are configured to connect a U-style bonnet to the valve actuator, with the U-style bonnet being pre-installed onto the globe valve, the connector assembly can be configured to releasably connect numerous types of globe valves that use different style of bonnets for mating the actuator to the globe valve. For example, a conversion kit may be developed that utilizes the U-style bonnet outside features, but contains different internal features. Basically, the adapted bonnet may become a two-piece collar that can close around an outer existing bonnet that is already installed. This could provide a universal solution for customers who desire to keep the existing globe valve. Further, the size and shape of the disc-shaped member 34 of the bonnet 30 and the slot 42 of the U-shaped connector 36 of the yoke 16 may be varied depending on the size and type of the globe valve assembly being secured to the yoke and the globe valve actuator 10.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method of connecting a globe valve assembly to a globe valve actuator, the method comprising:
   securing a connector assembly to a yoke of a yoke assembly that is secured to the globe valve actuator, the connector assembly including a first arm pivotally secured to the yoke and configured to engage the bonnet on one side of the bonnet, a second arm pivotally secured to the yoke and configured to engage the bonnet on an opposite side of the bonnet;
   positioning a bonnet of the globe valve assembly in the yoke;
   moving the first arm and the second arm from an open position in which the yoke can receive the bonnet to a closed position in which the arms engage and connect the bonnet to the yoke;
   fastening the arms in the closed position; and
   locking the arms in the closed position by sliding a slide lock toward the second arm, the slide lock having a body configured to slide along a length of the first arm.

2. A globe valve assembly comprising:
   a globe valve including a housing having an inlet and an outlet, the globe valve being configured to regulate a flow of fluid between the inlet and the outlet;
   a bonnet secured to the housing of the globe valve;
   a valve stem axially movable within the bonnet, the valve stem being secured to a valve member;
   a yoke assembly including a yoke secured to a globe valve actuator configured to move the valve stem and the valve member, and a connector assembly secured to the yoke and configured to be connected to the bonnet to secure the globe valve to the globe valve actuator, the connector assembly including
      a first arm pivotally secured to the yoke and configured to engage the bonnet on one side of the bonnet,
      a second arm pivotally secured to the yoke and configured to engage the bonnet on an opposite side of the bonnet, the first arm and the second arm being movable between an open position in which the yoke can receive the bonnet and a closed position in which the arms engage and connect the bonnet to the yoke, and
      a latch to fasten the arms in the closed position,
   wherein the bonnet includes a disc-shaped element, and
   wherein a lower portion of the yoke has a slot formed therein, the slot being configured to receive the disc-shaped element therein.

3. The globe valve assembly of claim 2, wherein the first arm includes a first clamping element and the second arm includes a second clamping element, the first clamping element being configured to engage the second clamping element to connect the bonnet when the disc-shaped element of the bonnet is received within the slot of the lower portion of the yoke.

4. The globe valve assembly of claim 3, wherein the first clamping element includes a clamp portion and the second clamping element includes a cam portion configured to mate with the clamp portion.

5. The globe valve assembly of claim 2, wherein the latch includes a first shoulder portion formed on the first arm and a second shoulder portion formed on the second arm, the first shoulder portion being configured to engage the second shoulder portion when the first arm and the second arm are in the closed position.

6. The globe valve assembly of claim 5, wherein the first arm is configured to be manipulated by hand to disengage the first shoulder portion from the second shoulder portion to move the first arm and the second arm to the open position.

7. The globe valve assembly of claim 2, wherein the first arm is secured to the yoke by a first pin and the second arm is secured to the yoke by a second pin.

8. A globe valve assembly comprising:
a globe valve including a housing having an inlet and an outlet, the globe valve being configured to regulate a flow of fluid between the inlet and the outlet;
a bonnet secured to the housing of the globe valve;
a valve stem axially movable within the bonnet, the valve stem being secured to a valve member;
a yoke assembly including a yoke secured to a globe valve actuator configured to move the valve stem and the valve member, and a connector assembly secured to the yoke and configured to be connected to the bonnet to secure the globe valve to the globe valve actuator, the connector assembly including
a first arm pivotally secured to the yoke and configured to engage the bonnet on one side of the bonnet,
a second arm pivotally secured to the yoke and configured to engage the bonnet on an opposite side of the bonnet, the first arm and the second arm being movable between an open position in which the yoke can receive the bonnet and a closed position in which the arms engage and connect the bonnet to the yoke, and
a latch to fasten the arms in the closed position,
wherein the connector assembly further includes a slide lock having a body configured to slide along a length of the first arm, the slide lock being configured to lock the first arm and the second arm in their closed position by sliding the body toward the second arm.

9. The globe valve assembly of claim 8, wherein the slide lock further includes a set screw configured to firmly fasten the body in place when locking the first arm and the second arm together.

10. A connector assembly for connecting a globe valve assembly to a globe valve actuator, the connector assembly comprising:
a first arm pivotally secured to a yoke of a yoke assembly that is secured to the globe valve actuator, and configured to engage a bonnet secured to the globe valve assembly on one side of the bonnet;
a second arm pivotally secured to the yoke and configured to engage the bonnet on an opposite side of the bonnet, the first arm and the second arm being movable between an open position in which the yoke can receive the bonnet and a closed position in which the arms engage and connect the bonnet to the yoke; and a latch to fasten the arms in the closed position,
wherein the bonnet includes a disc-shaped element configured to be received within a slot formed in a lower portion of the yoke.

11. The connector assembly of claim 10, wherein the first arm includes a first clamping element and the second arm includes a second clamping element, the first clamping element being configured to engage the second clamping element to secure the bonnet when the disc-shaped element of the bonnet is received within the slot of the lower portion of the yoke.

12. The connector assembly of claim 11, wherein the first clamping element includes a clamp portion and the second clamping element includes a cam portion configured to mate with the clamp portion.

13. The connector assembly of claim 10, wherein the latch includes a first shoulder portion formed on the first arm and a second shoulder portion formed on the second arm, the first shoulder portion being configured to engage the second shoulder portion when the first arm and the second arm are in the closed position.

14. The connector assembly of claim 13, wherein the latch of the first arm is configured to be manipulated by hand to disengage the first shoulder portion from the second shoulder portion to move the first arm and the second arm to the open position.

15. The connector assembly of claim 10, wherein the first arm is secured to the yoke by a first pin and the second arm is secured to the yoke by a second pin.

16. A connector assembly for connecting a globe valve assembly to a globe valve actuator, the connector assembly comprising:
a first arm pivotally secured to a yoke of a yoke assembly that is secured to the globe valve actuator, and configured to engage a bonnet secured to the globe valve assembly on one side of the bonnet;
a second arm pivotally secured to the yoke and configured to engage the bonnet on an opposite side of the bonnet, the first arm and the second arm being movable between an open position in which the yoke can receive the bonnet and a closed position in which the arms engage and connect the bonnet to the yoke;
a latch to fasten the arms in the closed position; and
a slide lock including a body configured to slide along a length of the first arm, the slide lock being configured to lock the first arm and the second arm in their closed position by sliding the body toward the second arm.

17. The connector assembly of claim 16, wherein the slide lock further includes a set screw configured to firmly fasten the body in place when locking the first arm and the second arm together.

* * * * *